Figure 1:
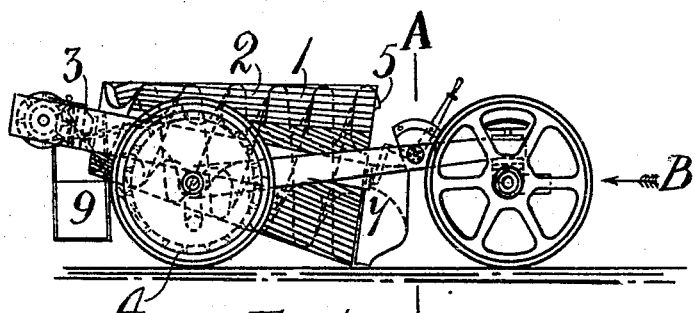

W. M. MARTIN.
MACHINE FOR THE HARVESTING OF POTATOES AND THE LIKE.
APPLICATION FILED DEC. 8, 1908.

931,882.

Patented Aug. 24, 1909.
3 SHEETS—SHEET 1.

WITNESSES
W. P. Burk
Geo. G. Smith

INVENTOR
William Martin Martin
BY Wm Wallace White
ATTY.

W. M. MARTIN.
MACHINE FOR THE HARVESTING OF POTATOES AND THE LIKE.
APPLICATION FILED DEC. 8, 1908.
931,882.
Patented Aug. 24, 1909.
3 SHEETS—SHEET 2.
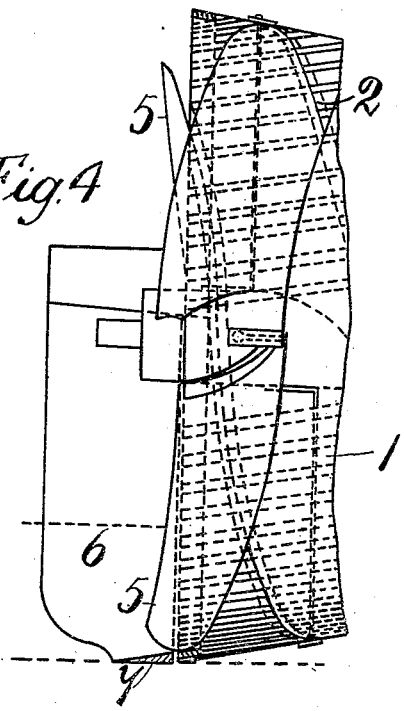
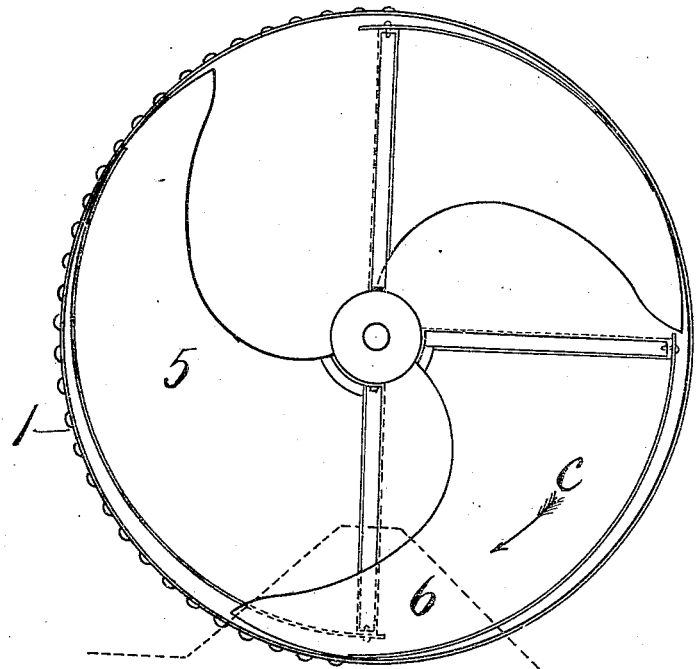
WITNESSES
W. P. Burke
Pans. G. Smith
INVENTOR
William Martin Martin
BY Wm Wallace White
ATTY.

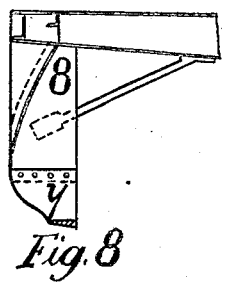
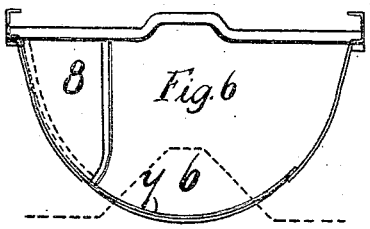
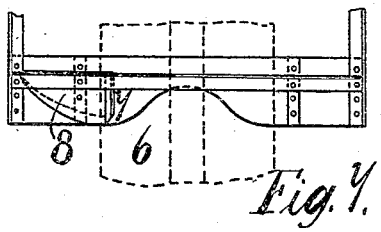
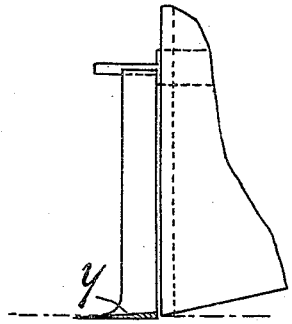
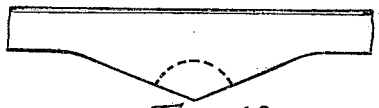

UNITED STATES PATENT OFFICE.

WILLIAM MARTIN MARTIN, OF DUNDEE, SCOTLAND.

MACHINE FOR THE HARVESTING OF POTATOES AND THE LIKE.

931,882.  Specification of Letters Patent.  Patented Aug. 24, 1909.

Application filed December 8, 1908. Serial No. 466,558.

*To all whom it may concern:*

Be it known that I, WILLIAM MARTIN MARTIN, a subject of the King of Great Britain, residing at 1 Royal Exchange Place, Dundee, in the county of Forfar, Scotland, have invented new and useful Improvements in Machines for the Harvesting of Potatoes and the Like, of which the following is a specification.

This invention relates to machines for the harvesting of potatoes and the like, the objects being to collect or gather them together, to free them from loose earth or soil and to deliver them into baskets, carts or other receptacles.

In order that my said invention and the manner of putting the same into practice may be properly understood, I have hereunto appended three explanatory sheets of drawings in which the same reference numerals are used to indicate corresponding parts in the figures shown.

Figure 2:
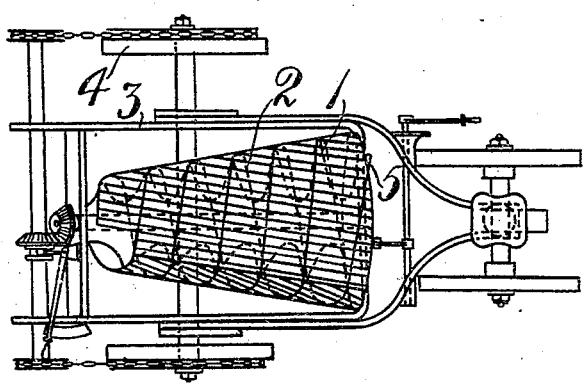
Figure 3:
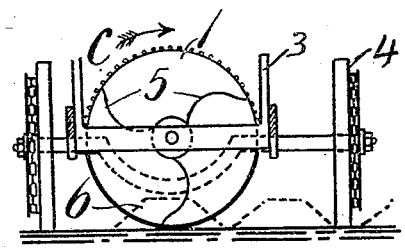

Figure 1 is a side elevation of the machine. Fig. 2 is a plan and Fig. 3 is a sectional elevation at A. A. (Fig. 1) looking in the direction of the arrow B. Fig. 4 is a part sectional elevation of the rotatory cylinder and the share. Fig. 5 is a front elevation of the cylinder showing the directional screw blades. Fig. 6 is a front elevation of the share. Fig. 7 is a plan and Fig. 8 is a sectional elevation of same. Fig. 9 is a front elevation of a modified share. Fig. 10 is a plan and Fig. 11 is a sectional elevation of same.

In carrying out my invention, I employ a cylinder 1— which rotates in the direction of the arrow C— having one or more Archimedean internal screws or guides 2 (—continuous or in parts—) which are of suitable diameter and length. This cylinder in its working position (as in Figs. 1, 2, and 3) is either inclined to or is parallel to the ground and is carried by a frame 3 which is mounted on wheels 4. The front extremity of the cylinder is provided with one or more directional screw blades 5 (three are shown) which may be spooned, curved, straight, or angled, each blade being a part of a screw, the arrangement being such that when the cylinder with its blades rotates and moves forward the earth 6 and the potatoes when lifted and guided by the share 7 which is described later, are relatively pushed backward through the revolving cylinder where the earth is separated from the potatoes by riddling and the potatoes deposited in receptacles or on the ground.

The blades may protrude beyond the cylinder which carries them, as is shown in Fig. 4 or they may be contained wholly within it and their edges may be shaped or blunted to thrust the potatoes aside without injuring them.

The share 7 which may be inclined, or horizontal or partly inclined and partly horizontal consists of a curved plate, part of which may be flattened or it may be compounded of a plate and prongs, or of prongs alone and is so disposed that it partly or wholly embraces the lower extremity of the cylinder, or its blades, that is to say the points of the blades 5 may sweep over the concave surface of the share or behind it. The inclination and height of the share may be regulated relative to the ground.

8 is a guide pocket or conveyer whose purpose is to lead the earth and the potatoes into the cylinder. The pocket is merely a receptacle into which the ground and potatoes are thrown by the screw blades from whence they fall back into the revolving screen, that is, the pocket performs a passive part and the front keeps the material from falling out. The action of the share is to lift the earth and the potatoes and the action of the rotating blades is to sweep such earth and potatoes back through the cylinder.

In some cases the share and the rotatory lifter may be used by themselves. The potatoes are delivered from the cylinder 1 into a hopper 9 which may be provided with two exit chutes and a pivoted flap so arranged that when it lies to one side one exit is open and conversely, delivering into bags baskets or the like. The hopper if desired may deliver into a truck drawn by the machine, or into an elevator and from thence into a cart moving alongside. The potatoes or other material may be delivered directly into bags, baskets, or other receiver.

Having now described my invention what I claim as new and desire to secure by Letters Patent is;—

A potato digger comprising a frame, wheels supporting the same, a rotating cylinder supported by the frame and having openings therein, screws within the cylinder, a share supported by the frame in front of the lower edge of the cylinder, and a pocket formed at the upper edge of the share for delivering the earth and potatoes from the share into the cylinder.

In testimony whereof I have signed my name to this specification in the presence of two subscribing witnesses.

WILLIAM MARTIN MARTIN.

Witnesses:
GEORGE CAMERON DOUGLAS,
AGNES CULBARD DOUGLAS.